United States Patent Office 3,415,311
Patented Dec. 10, 1968

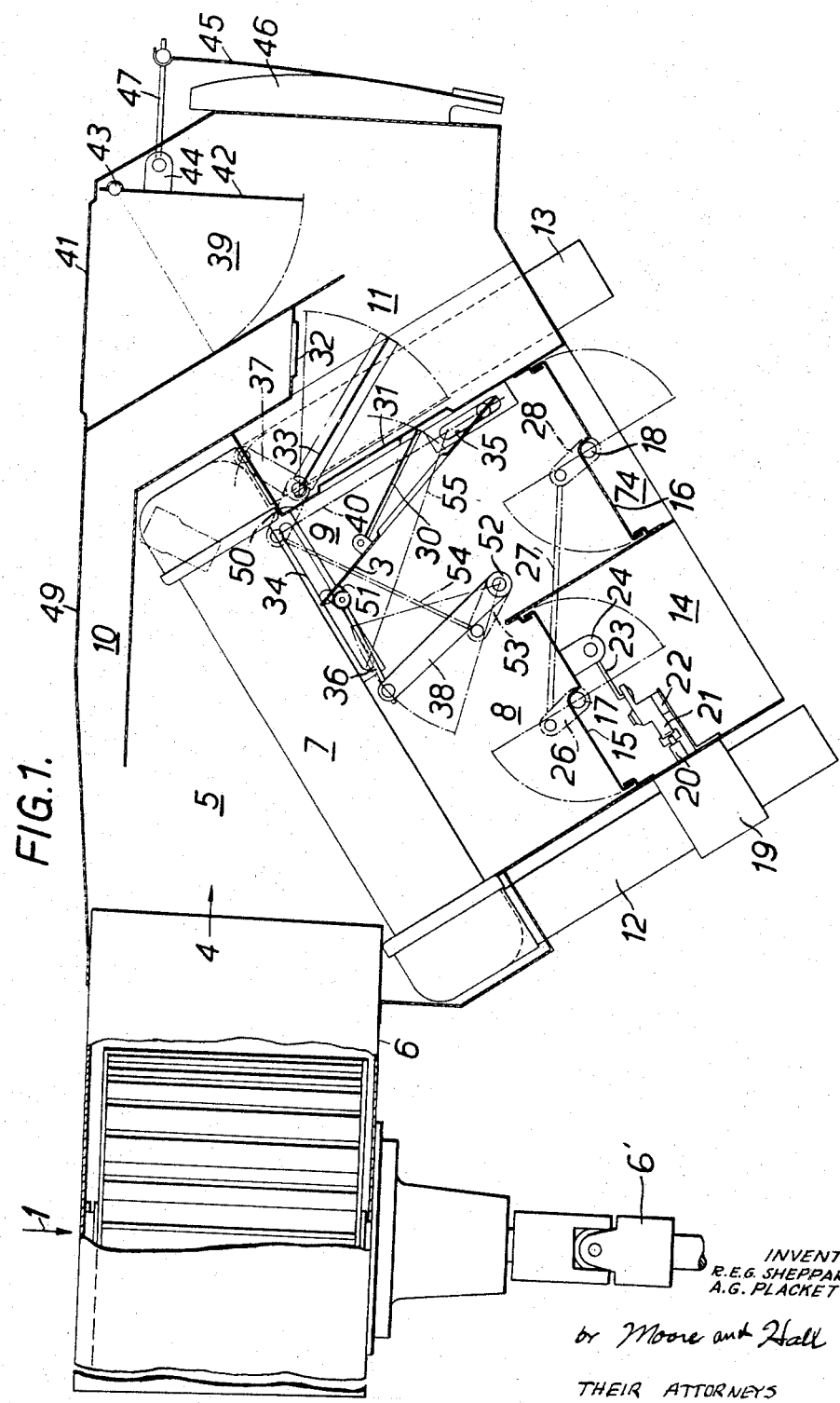

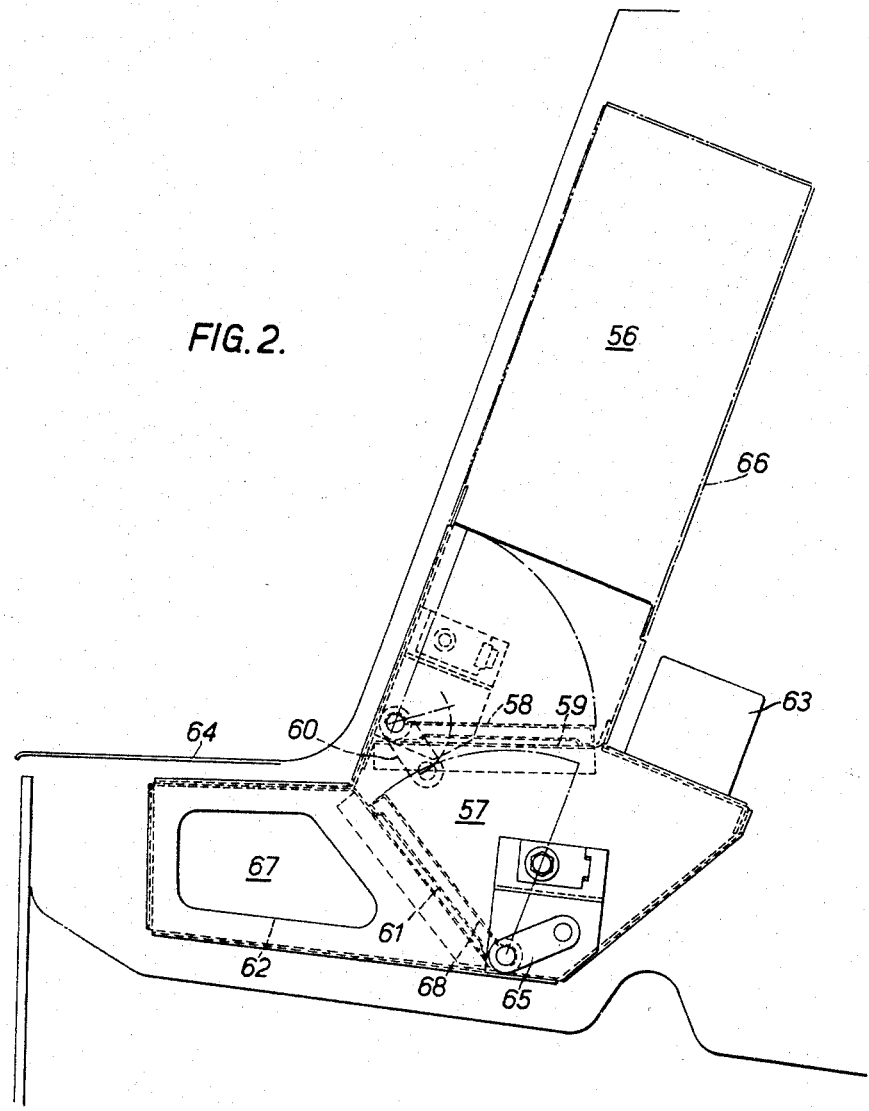

3,415,311
ENGINE COOLING AND PASSENGER COMPARTMENT HEATING APPARATUS FOR MOTOR VEHICLES
Raymond Edwin George Sheppard, Burford, and Anthony Geoffrey Plackett, Aston, England, assignors to Smiths Industries Limited, London, England, a British company
Filed Sept. 1, 1966, Ser. No. 576,611
8 Claims. (Cl. 165—33)

ABSTRACT OF THE DISCLOSURE

The disclosure relates to engine cooling and passenger compartment heating apparatus for a motor vehicle. The apparatus includes a mixing compartment from which air can flow to the passenger compartment and a heat exchanger for receiving engine coolant. A fan draws air from the exterior through the heat exchanger and into the mixing compartment. A wall on the downstream side of the heat exchanger divides the air into two air streams so that part of the heat transfer surface is contacted by one air stream and a part by the other air stream, and the wall is movable to alter the ratio of the areas of heat transfer surface contacted by the two air streams.

---

According to this invention there is provided engine cooling and passenger compartment heating apparatus for a motor vehicle comprising a mixing compartment from which air can flow to the passenger compartment, a heat exchanger adapted to receive engine coolent liquid, a fan arranged to cause air drawn from the exterior of the vehicle to pass through the heat exchanger and to pass directly to the mixing compartment, a wall disposed on the downstream side of the heat exchanger which divides the air passing through the heat exchanger into two airstreams so that part of the heat transfer surface of the heat exchanger is contacted by one airstream and part by the other airstream, the wall being movable to alter the ratio of the areas of heat transfer surface contacted by the two airstreams, the said one airstream being passed to an outlet leading to the exterior of the vhicle and the said other airstream being passed to the mixing compartment, and a manually operable valve which controls the proportions of air reaching the mixing compartment directly and through the heat exchanger and which is connected to the wall so that as the valve is operated to increase the proportion of air which reaches the mixing compartment directly the wall is moved to reduce the area of heat transfer surface with which the said other airstream comes in contact.

Preferably the apparatus comprises a valve means which controls the flow of air through the said outlet and a thermally responsive actuator arranged to be responsive to the temperature of the engine coolant and to actuate the valve means, the arrangement being that no air flows through the said outlet below a predetermined coolant temperature.

Preferably the wall is formed with an opening, the air flow through which is controlled by a pressure operated valve, the flow of air through the opening being permitted when the air pressure is greater on the side of the wall where the said one airstream flows than on the side of the wall where the said other airstream flows whereby when the flow of air through the said opening is not permitted by the valve means, the said one airstream flows through the opening in the wall and merges with the said other airstream.

Preferably the fan is arranged to be driven by the vehicle engine.

In use, in a warm ambient atmosphere when the passenger compartment does not require to be heated and maximum engine cooling is required, the wall is moved by operation of the valve by the vehicle driver in the direction to increase the heat transfer area contacted by the said one airstream and to reduce the heat transfer area contacted by said other air stream. In a cold ambient atmosphere, when the passenger compartment must be heated, the wall is moved by operation of the valve by the vehicle driver in the direction to reduce the heat transfer area contacted by the said one airstream, and to increase the heat transfer area contacted by the other airstream.

The wall may be movable between two extreme positions in one of which the heat transfer area contacted by the one airstream is greater than, but of the same order as, the heat transfer area contacted by the said other airstream, and in the other of which all the air passing through the heat exchanger passes to the outlet leading to the exterior of the vehicle so that the said other airstream does not exist.

Engine cooling and passenger compartment heating apparatus for a motor vehicle and in accordance with this invention will now be described with reference to the accompanying drawings of which:

FIGURE 1 is a sectional elevation of part of the apparatus.

FIGURE 2 is a side elevation of a further part of the apparatus.

Referring to FIGURE 1, air is drawn in the direction of the arrow 1 from a plenum chamber (not shown) into the eye of a centrifugal fan (indicated in outline at 6) which discharges it in the direction of the arrow 4 into a compartment 5. The plenum chamber is situated immediately in front of and below the vehicle windscreen and the direction of the arrow 1 is that of the forward motion of the vehicle. The fan 6 is driven by the vehicle engine through a universal coupling 6'. The air impelled into the compartment 5 by the fan 6 either passes through a radiator matrix 7 into compartments 8 and 9 or passes through a passage 10 at the side of the compartment 5 into a mixing compartment 11. The radiator matrix 7 is supplied with engine coolant liquid through flow and return pipes 12 and 13 and no valves are provided to control the flow of engine coolant and is the only matrix provided to cool the engine coolant.

The compartments 8 and 9 are divided by a wall 3 which is movable as will be explained later. The compartment 8 communicates directly with ducts 14 and 74 through which air can discharge to the exterior of the vehicle. The flow of air through the ducts 14 and 74 is controlled by two flaps 15 and 16 respectively mounted on rotatable shafts 17 and 18 respectively. The position of the flaps is controlled by a wax thermostat 19 mounted in the pipe 12 so as to be responsive to the coolant temperature. The thermostat 19 has a pin 20 which is moved out of the wax thermostat 19 in response to an increase in coolant temperature and which is rotatably linked to one end of a lever 21. The lever 21 is at an angle of about 20° to the plane of the section of FIGURE 1 and extends for a small distance in the direction of the plane of FIGURE 1. The pin 20 begins to move out of the thermostat when the coolant temperature reaches a predetermined temperature e.g. 85° C. The lever 21 is rotatably linked at its other end to one end of a rod 23 and can pivot about a fixed pin 22 along its length. The other end of the rod 23 is attached to a bracket 24 welded to the flap 15. The shafts 17 and 18 are carried rotatably by the walls of the ducts 14 and 74 and project beyond the ends of the ducts 14 and 74. The end of the shaft 17 has fixed to it an arm 26, the end of which is rotatably linked to one end of a link 27. The other end of the link 27 is rotatably linked to an arm 28 attached to the shaft 18. The flaps 15 and 16 are urged to the closed position by a spring which is not shown. In use, when the coolant temperature increases above the predetermined temperature the pin 20 moves out of the thermostat 19 and rotates the link 21 about the pin 22. The rod 23 is thus moved to the left and the flap 15 and the shaft 17 are rotated in the direction to permit the flow of air through the duct 14. The motion of the flap 15 is transmitted to the flap 16 by the arm 26, link 27 and arm 28 as will be realised. The spring always urges the flaps 15 and 16 towards their closed positions.

Air flowing into compartment 9 flows into the mixing compartment 11 through an opening 31 whereas air flowing into the compartment 11 from the passage 10 flows through an opening 32. The flow of air through the openings 31 and 32 is controlled by a flap 33 operable by the vehicle driver through a flexible cable (not shown). The flexible cable is attached to an arm 37 rigid with flap 33 as is an arm 50. The wall 3 is mounted in slots 34 and 35 so that it is movable as a whole towards and away from the opening 31. The upper end of the wall 3 has a bracket 51 welded to it, one end of a rod 36 being rotatably connected to the bracket 51. The other end of the rod 36 is rotatably linked to an arm 38 fixed to a shaft 52 as is an arm 53. The arm 53 is rotatably linked to one end of a link 54 the other end of which is linked to arm 50. When the flap 33 is rotated in the clockwise direction, the wall 3 is moved towards the opening 31 through the transmission described so that compartment 8 is "expanded" at the expense of compartment 9 and when the flap 33 is rotated in the counterclockwise direction, the wall 3 is moved away from the opening 31 through the transmission described so that the compartment 9 is "expanded" at the expense of compartment 8. When the flap 33 closes opening 31, the wall 3 is in the position indicated by the dotted line 40 and when flap 33 closes opening 32, the wall 3 is in the position indicated by the dotted line 55.

The wall 3 has an opening normally closed by a flap 30, the flap 30 being normally held in its closed position by air pressure. However, when the pressure of the air in compartment 8 exceeds that in the compartment 9 the flap 30 is moved away from its closed position.

Air entering the mixing compartment 11 passes into the compartment 39 and passes out of the compartment 39 through the opening 41 into a duct (not shown). The duct leads to a distribution unit shown in FIGURE 2.

A flap 42 is mounted in the compartment 39 and is rotatable about an axis 43. A bracket 44 is welded to the flap 42 and is rotatably connected to one end of a rod 47 which passes through the wall of the compartment 39 and engages one end of a blade spring 45. The blade spring 45 is connected at its other end to a shaped member 46 with which the blade 45 is in contact over part of its length. In use, the pressure of air in the compartment 39 changes with the engine speed. The pressure of the air in the compartment 39 acts against the flap 42 in the sense to rotate it about the axis 43 in the clockwise direction whereas the spring 45 acts through the rod 47 on the flap 42 in the sense to rotate it in the counterclockwise direction. The force-displacement characteristic of the end of blade 45 is such that over a wide range of engine speeds, an increase or reduction in the engine speed and air pressure causes the flap 42 to be rotated through an angle such that the air flow through compartment 39 remains substantially constant.

The force-displacement charasteristic of the blade 45 is set by the shape of the member 46.

The compartments 5, 8, 9, and 11 and the duct 14 and the passage 10 are all defined at least in part by a sheet metal housing 49 and sheet metal partitions therein.

Referring now to FIGURE 2, the distribution unit is located within the passenger compartment of the vehicle. The duct leading from the opening 41 passes the air to a passage 56 from which the air can pass to a compartment 57 through an opening 59. The flow of air through the opening 59 is controlled by a flap 58 which is operable by the vehicle driver through a flexible cable (not shown) and an arm 60 attached to the flap 58. Air can flow out of compartment 57 through two openings 63 (only one can be seen) and ducts (not shown) to the windscreen of the vehicle or can flow through an opening 61 into a compartment 67. The flow of air through the opening 61 is controlled by a flap 68 operable by the vehicle driver through a flexible cable (not shown) and an arm 65 attached to the flap 68. The air can flow out of compartment 67 through a number of openings 62 (only one can be seen) to the passenger compartment of the vehicle. The opening 61 is closed when it is desired to boost the flow of air to the windscreen. The passage 56 and 67 are all defined in part by a sheet metal housing 66 and sheet metal partitions therein. The outline of the vehicle is indicated at 64. The flaps 33 and 58 are connected to a common lever operable by the vehicle driver. The lever co-operates with a scale marked "OFF" "COLD" "WARM" and "HOT" in that order.

In the "OFF" position wall 3 is in the position indicated by the line 40, flap 33 closes opening 31 and flap 58 closes opening 59. In the "COLD" position wall 3 is in the position indicated by the line 40, flap 33 closes opening 31 but flap 58 does not close opening 59. In the "WARM" position wall 3 and flap 33 are in intermediate positions and flap 58 does not close opening 59. In the "HOT" position wall 3 is in the position indicated by the line 55, flap 33 closes opening 32, and flap 58 does not close opening 59.

The operation of the apparatus as a whole will now be described. It will first be assumed that the ambient temperature is low, that flap 58 has not closed opening 59, and that the flap 33 closes opening 32 (wall 3 is on line 55). Initially when the vehicle engine is started, the coolant temperature is low and flaps 15 and 16 prevent the flow of air through the ducts 14 and 74. The fan 6 drives air through the matrix 7 thereby heating the air and the air flows into the compartments 8 and 9. As the air in compartment 9 flows into compartment 11, the pressure of the air in compartment 8 exceeds that in compartment 9 as long as the flap 30 is in its closed position, the flap 30 is blown away from the wall 13 and air flows from the compartment 8 to compartment 9. The air flows through compartments 11, 39 to the distribution unit, the flow rate being kept constant by flap 42. When the flaps 15 and 16 open, flap 30 closes and air discharges through the ducts 14 and 74 to the vehicle exterior. The flap 30 closes when flaps 15 and 16 open as the pressure in compartment 9 is greater than that in compartment 8 because the airflow through compartment is greater. Thus, until the flaps 15 and 16 open, the whole of the heat dissipated by the matrix 7 is passed into the vehicle interior, thus ensuring a rapid "warm up" of the passenger compartment. If the ambient temperature is high, the flap 33 is in the position in which it closes the opening 31 and the wall 3 is in line with the line 40. When the engine is initially started no air flows through the matrix 7 as flaps 15 and 16 prevent the flow of air through ducts 14 and 74 and opening 31 is closed by wall 3 and flap 33. When the coolant temperature exceeds the predetermined temperature the flaps 15 and 16 open and air flows through the matrix 7 cooling the coolant and discharges through the ducts 14 and 74. If the flap 33 is in an intermediate position cold air flows into the compartment 11 from the passage 10 and hot air from the compartment 9. The resultant mixture of air at an intermediate temperature is passed to the distribution unit. It will be seen that during summer when the ambient temperature is high, substantially the whole of the matrix 7 is available to cool the coolant whereas at a period of low ambient temperature, part of the matrix 7 is used to cool the coolant and part to heat the air supplied to the passenger compartment.

If the flap 33 is in an intermediate position, the proportion of the matrix 7 used for heating the air passed to the passenger compartment is reduced.

In use, as the air flow through compartment 9 is substantially constant, its temperature is also substantially constant, provided the air inlet temperature and the coolant temperature are constant.

The size of the matrix may be smaller than the combined size of the matrix provided for engine coolant cooling and the matrix provided for heating the air supplied to the passenger compartment in a conventional arrangement which uses separate matrices for the two purposes.

It will be seen that the fan 6 and the flap 42 are both outside the passenger compartment. The flap 42 may create noise when it moves in response to a change in engine speed.

It will also be seen that when flap 58 closes opening 59, the air pressure tends to hold it closed.

We claim:

1. Engine cooling and passenger compartment heating apparatus for a motor vehicle comprising a mixing compartment from which air can flow to the passenger compartment, a heat exchanger adapted to receive engine coolant liquid, a fan arranged to cause air drawn from the exterior of the vehicle to pass through the heat exchanger and to pass directly to the mixing compartment, a wall disposed on the downstream side of the heat exchanger which divides the air passing through the heat exchanger into two airstreams so that part of the heat transfer surface of the heat exchanger is contacted by one airstream and part by the other airstream, the wall being movable to alter the ratio of the areas of heat transfer surface contacted by the two airstreams, the said one airstream being passed to an outlet leading to the exterior of the vehicle and the said other airstream being passed to the mixing compartment, and a manually operable valve which controls the proportions of air reaching the mixing compartment directly and through the heat exchanger and which is connected to the wall so that as the valve is operated to increase the proportion of air which reaches the mixing compartment directly the wall is moved to reduce the area of heat transfer surface with which the said other airstream comes in contact.

2. Apparatus as claimed in claim 1 which comprises of a valve means which control the flow of air through the said outlet and a thermally responsive actuator arranged to be responsive to the temperature of the engine coolant and to actuate the valve means the arrangement being that no air flows through the said outlet below a predetermined coolant temperature.

3. Apparatus as claimed in claim 2 wherein the wall is formed with an opening, the air flow through which is controlled by a pressure operated valve, the flow of air through the opening being permited when the air pressure is greater on the side of the wall where the said one airstream flows than on the side of the wall where the said other airstream flows.

4. Apparatus as claimed in claim 1, wherein the wall is movable between two extreme positions in one of which the heat transfer area contacted by the one airstream is greater than, but of the same order as, the heat transfer area contacted by the said other airstream, and in the other of which all the air passing through the heat exchanger passes to the outlet leading to the exterior of the vehicle so that the said other airstream does not exist.

5. Apparatus as claimed in claim 4 which further includes a stabilizing valve which maintains the rate of flow of air from the mixing compartment to the passenger compartment substantially constant over a wide range of fan speed.

6. Apparatus as claimed in claim 5 wherein the stabilizer valve comprises a pivoted flap which is located in a passage through which air flowing from the mixing compartment to the passenger compartment passes so as to control the flow of air through the passage and is disposed so that the flow of air through the passage tends to move it in a direction to reduce the flow of air, and spring means which resist the movement of the flap in the said direction and which have a non-linear force-displacement characteristic such that the flow of air through the passage remains substantially constant over a wide range of fan speeds.

7. Apparatus as claimed in claim 5 wherein the stabilizer valve is disposed outside the passenger compartment of the vehicle.

8. Apparatus as claimed in claim 1, which comprises further valve means which control the flow of air from the mixing compartment to the passenger compartment, the further valve means being connected to the wall so that if the further valve means are operated to prevent the flow of air to the passenger compartment, the wall is moved to reduce the area of heat transfer surface with which the said other airstream comes in contact.

References Cited

UNITED STATES PATENTS

| | | | |
|---|---|---|---|
| 1,833,324 | 11/1931 | Kenneweg | 237—2 |
| 2,413,770 | 1/1947 | Knoy | 237—12.3 |

EDWARD J. MICHAEL, *Primary Examiner*.

U.S. Cl. X.R.

236—35.2